Patented Sept. 10, 1929.

1,728,068

UNITED STATES PATENT OFFICE.

BERTRAM MAYER AND HUGO SIEBENBUERGER, OF BASEL, SWITZERLAND, ASSIGNORS TO SOCIETY OF CHEMICAL INDUSTRY IN BASLE, OF BASEL, SWITZERLAND.

VAT DYESTUFF AND PROCESS OF MAKING SAME.

No Drawing. Application filed January 12, 1928, Serial No. 246,381, and in Switzerland February 2, 1927.

The present invention relates to new dyestuffs which are particularly valuable for the production of fast tints.

The invention is an improvement in or modification of that described in specification Serial No. 150,371, filed on November 23rd, 1926. That specification describes the the manufacture of halogenated products of violanthrone by treating with chlorinating agents violanthrone at a temperature above 80° C. in presence of an indifferent diluent which is not miscible with water and in such a manner that about three chlorine atoms enter the dyestuff molecule. The products are distinguished from the halogenated products of violanthrone previously described by their blue tint and their unexpected fastness to water.

According to the present invention similar products in part dyeing a still more pure tint are obtained by treating with chlorine, or an agent that yields chlorine, the halogenated products of violanthrone which are obtained as described in the Letters Patent No. 837,775. The products thus obtained contain between three and five chlorine atoms in their molecule. The place in which the chlorine atoms attached to the molecule of the violanthrone corresponding with the formula:

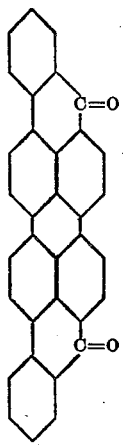

is not known.

The following examples will serve to further illustrate the nature of our invention and the manner in which it can be carried into practical effect; but our invention is not confined to these examples. The parts are by weight:—

Example 1.

10 parts of the dyestuff made as described in Example 1 of Letters Patent No. 837,775 by brominating violanthrone in acetic acid at boiling temperature and containing about 30 per cent of bromine, are suspended in 100 parts of nitrobenzene and the suspension is heated to about 130° C. In the course of about 3 hours 10 parts of chlorine gas are passed into the suspension. While the chlorination process proceeds bromine disappears and after cooling the liquid to 70° C. air is blown through it for some time while it is maintained at this temperature; the whole is filtered hot and the solid matter constituting the dyestuff is washed successively with nitrobenzene, alcohol and hot water and dried.

The new dyestuff, the chlorine content of which lies between that of a tetra- and that of a penta-chloro-derivative, contains only traces of bromine. It is a dark blue powder which dissolves in concentrated sulfuric acid to a blue violet solution. When the solution is poured into water, bright blue flocks separate. The dyestuff dissolves in hot nitrobenzene to a violet-blue solution having an intense brown red fluorescene; in hot aniline to a bright reddish-blue. It yields an intensely green-blue vat. It dyes cotton blue tints which are more pure and green than those which are obtained by the dyestuffs made as described in specification Serial No. 150,371 of 1926. The dyeings have good properties of fastness; above all they excel in fastness to water.

Example 2.

10 parts of the dyestuff made as described in Example 3 of Letters Patent No. 837,775 by chlorinating violanthrone with chlorine at 60–70° C., are treated with chlorine as described in Example 1. The dyestuff is isolated in the manner described in that example.

This dyestuff containing between three and four chlorine atoms is a violet blue powder which dissolves in concentrated sulfuric acid to a more violet solution. On addition of water, blue flocks are separated. In hot nitrobenzene it dissolves to a blue violet solution having a brown red fluorescence. In hot aniline to a violet blue solution. The vat is green blue and dyes cotton pure blue tints which are particularly characterized by their fastness to water.

What we claim is:—

1. A process for the production of vat dyestuffs by treating the brominated products of violanthrone obtained by brominating violanthrone with bromine in boiling galcial acetic acid with a chlorinating agent at a temperature above 80° C., and in presence of an indifferent diluent which does not mix with water.

2. A process for the production of vat dyestuffs by treating the brominated products of violanthrone obtained by brominating violanthrone with bromine in boiling glacial acetic acid with a chlorinating agent at a temperature above 80° C., in presence of an indifferent diluent which does not mix with water and in such a manner that at least three chlorine atoms enter the dyestuff molecule.

3. As new products of manufacture the new products which may be obtained by treating the brominated products of violanthrone by brominating violanthrone with bromine in boiling glacial acetic acid with a chlorinating agent at a temperature above 80° C., and in presence of an indifferent diluent which does not mix with water, which products contain between three and five chlorine atoms, and form dark blue to violet blue powders, dissolving in concentrated sulfuric acid to blue violet to violet solutions, yielding green blue vats from which cotton is dyed very fast pure blue tints, especially fast to water.

4. As new products of manufacture the chlorination products of violanthrone containing between four and five chlorine atoms in their molecules, which products form dark blue powders, dissolving in concentrated sulfuric acid to blue violet solutions, yielding an intensely green blue vat from which cotton is dyed very fast pure blue tints, especially fast to water.

5. Material dyed with the products of claim 3.

6. Material dyed with the products of claim 4.

In witness whereof we have hereunto signed our names this 2nd day of January, 1928.

BERTRAM MAYER.
HUGO SIEBENBUERGER.